Patented Dec. 14, 1937

2,102,516

UNITED STATES PATENT OFFICE 2,102,516

FLEXIBLE CHEESE COATING

Henri Jan Coster, The Hague, Netherlands, assignor to Special Products Company, Chicago, Ill., a corporation of Delaware No Drawing. Application September 26, 1936, Serial No. 102,699

3 Claims. (Cl. 134—1)

The present invention relates to an improved composition of matter particularly adapted for use as a coating for cheese. More specifically, the present invention relates to a flexible cheese coating and the process of producing the same.

Considerable development has taken place in recent years in the art of preparing cheese of various types for the market, and particularly in preparing or coating cheese with air and moisture-proof materials and compositions. Prior suggestions necessarily limited to materials which do not taint or contaminate cheese, include, for example, metal foil, cellulosic sheets and paraffin, all of which have been found to be not entirely satisfactory. For example, metal foil corrodes to some extent when in contact with cheese. The use of wrapping materials such as metal foil and cellulosic sheets have also been found to be unsuitable for all applications, particularly where the cheese is to be kept for some length of time before use, due to the practical impossibility of forming an air and moisture proof covering. To insure proper curing and to retain the proper moisture content and the distinctive flavor of the cheese where the cheese is to be stored or kept on the shelves for long periods of time, it is essential that an inert, adherent, air and moisture proof coating be provided.

The solution of the problem was not fully attained by providing air and moisture proof paraffin wax coatings, formed by dipping the cheese in molten paraffin at temperatures between 170° and 270° F. The paraffin coatings, it has been found, do not always adhere properly to the rind or crust of the cheese. Moreover, as the paraffin is brittle the coating frequently peels and flakes off in storage. When handling the coated cheese the non-flexible and non-adherent paraffin is easily cracked and chipped and falls off. The flaking off of the paraffin coatings leaves the cheese exposed to the air and moisture and open to contamination.

It is an object of my invention to provide a flexible composition of matter particularly adapted for use as a coating for cheese.

It is also an object of my invention to provide an improved composition of matter which will adhere to the rind of cheese.

It is a further object of my invention to provide an air and moisture proof coating for cheese which is flexible and adherent and is not easily chipped and flaked off.

Other objects will be apparent as the description hereinafter proceeds.

I have discovered that a flexible composition of matter particularly adapted for use as a coating for cheese may be prepared by stirring a melted mixture comprising about 50 to 85 percent white scale wax having a melting point of approximately 120°–130° F. and about 15 to 50 percent petroleum wax having a melting point of approximately 130°–140° F. The composition may also contain a minor proportion of petroleum wax having a melting point of approximately 160°–170° F. The final composition should have a melting point of about 130°–140° F.

The three ingredient compositions may be as follows: 50 to 85 percent white scale wax having a melting point of 120°–130° F., 10–30 percent petroleum wax having a melting point of 130°–140° F., and 5–20 percent petroleum wax having a melting point of 160°–170° F. This composition also has a melting point of about 130°–140° F. and is flexible within wide ranges of temperature.

The following example showing a preferred composition will serve to illustrate my invention.

72 parts of white scale wax having a melting point of 126°–128° F., 19 parts of petroleum wax having a melting point of 130°–140° F. and 9 parts of a petroleum wax having a melting point of 160°–170° F. are mixed together while heated to a temperature of about 260° F. After a uniform mixture is obtained the composition is ready for use. The coating of the cheese is a relatively simple operation involving merely the dipping of the molded cheese, usually bandaged, in the molten wax. This operation is well known to the cheese coating art and is similar to the procedure used in applying paraffin coatings. After the cheese is removed from the bath, the dipping requiring only a few seconds depending upon the thickness of the coating desired, the coating composition is, of course, allowed to cool. Repeated dippings may also be resorted to to increase the coating's thickness.

The coating is flexible within wide ranges of temperature and retains its flexibility at ordinary storage temperatures, e. g. about 40°–50° F., and no trouble is encountered in climates subjected to severe winters and hot summers. The coating, which resembles a thin skin, adheres to the rind of the cheese and does not crack and chip and fall off. The coating in fact appears to be "welded" to the cheese. My inert coating, which is easily applied, is, of course, air and moisture proof and will not taint nor contaminate the cheese.

I have found that the melting point of my improved composition should be about 130°–140° F. and that the cheese should be dipped at a temperature of approximately 260°–270° F. This temperature gives a nice thin cheese coating and in a certain degree will help in sterilizing and killing foreign bacteria that may be present on the surface or rind of the cheese.

My improved composition is particularly adapted for use as a coating for cheese although it may be employed for coating other food products and the like, or used for any purpose where a flexible, air and moisture proof composition is desired. The composition when used for cheese coating generally comprises 1 percent by weight of the total weight of the cheese.

"White scale wax" as used in the specification and claims relates to a white wax obtained from petroleum. This wax which resembles paraffin contains a small amount of oil and melts at 120°–130° F. It is brittle although not so much so as the highly refined paraffin.

"Petroleum wax" as used in the specification and claims relates to a firm vaseline-like (petrolatum) product melting at 130°–140° F. and to a hard cup grease-like product melting at 160°–170° F. Both of the petroleum waxes, as the names indicates, are obtained from petroleum. The specific gravity of these compositions is approximately 0.92.

The white scale wax and the petroleum waxes referred to above are well known compositions in the oil refining industry. They consist, of course, of mixtures of various hydrocarbons and may be purchased on the open market by specifying the melting points of the particular fractions desired.

While I have described my novel composition showing certain preferred percentages of the paraffin-like white scale wax and vaseline-like petroleum wax, which may or may not contain some hard grease-like petroleum wax, it will be understood that my invention is not necessarily limited thereto. The ingredients of my flexible composition may be varied within the ranges indicated. For various types of cheeses various combinations of the described ingredients may be employed. Thus it will be understood that all modifications coming within the true spirit and scope of my invention are intended to be covered by the claims annexed hereto.

I claim:

1. A composition of matter particularly adapted for use as a coating for cheese, comprising a uniform mixture of 50 to 85 percent white scale wax having a melting point of 120°–130° F. and 15 to 50 percent petroleum wax having a melting point of 130°–140° F., said composition in thin layers being flexible at ordinary storage temperatures, and having a melting point of about 130°–140° F.

2. A composition of matter particularly adapted for use as a coating for cheese, comprising a uniform mixture of 50 to 85 percent white scale wax having a melting point of 120°–130° F., 10 to 30 percent petroleum wax having a melting point of 130°–140° F., and 5 to 20 percent petroleum wax having a melting point of 160°–170° F., said composition being flexible and having a melting point of about 130°–140° F.

3. A composition of matter particularly adapted for use as a coating for cheese, comprising a uniform mixture of 72 percent white scale wax having a melting point of 126°–128° F., 19 percent petroleum wax having a melting point of 130°–140° F., and 9 percent petroleum wax having a melting point of 160°–170° F., said composition being flexible and having a melting point of about 130°–140° F.

HENRI JAN COSTER.